United States Patent
Boss et al.

(10) Patent No.: US 7,408,465 B2
(45) Date of Patent: Aug. 5, 2008

(54) METHOD OF USING RFID SYSTEMS TO HELP BLIND AND VISUALLY-IMPAIRED INDIVIDUALS

(75) Inventors: Gregory Jensen Boss, American Fork, UT (US); Christopher James Dawson, Arlington, VA (US); Peter George Finn, Brampton (CA); Rick Allen Hamilton, II, Charlottesville, VA (US)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 11/334,230

(22) Filed: Jan. 18, 2006

(65) Prior Publication Data

US 2007/0176785 A1 Aug. 2, 2007

(51) Int. Cl.
*G08B 13/14* (2006.01)

(52) U.S. Cl. .............. 340/572.1; 340/572.4; 340/572.8; 340/825.19; 340/825.4; 340/994; 340/407.1

(58) Field of Classification Search .............. 340/572.1, 340/572.4, 572.8, 825.19, 825.49, 944, 407.1, 340/825.4, 994
See application file for complete search history.

(56) References Cited

U.S. PATENT DOCUMENTS

| 2002/0121986 A1 | 9/2002 | Krukowski et al. |
| 2005/0099318 A1* | 5/2005 | Gilfix et al. ............. 340/825.19 |
| 2007/0096908 A1* | 5/2007 | Chu et al. ................. 340/572.1 |
| 2007/0156414 A1* | 7/2007 | Akhtar .......................... 705/1 |

FOREIGN PATENT DOCUMENTS

| JP | 11347061 | * 12/1999 |
| JP | 2005046607 | * 2/2005 |

* cited by examiner

*Primary Examiner*—Tai T Nguyen
(74) *Attorney, Agent, or Firm*—Volel Emile; David A. Mims, Jr.

(57) ABSTRACT

An apparatus, system and method of using RFID systems to help blind and visually-impaired individuals function efficiently in society without the use of canes and/or seeing-eye dogs are provided. Generally, each object may contain an RFID tag affixed thereto. The tag will include information needed to help a blind or visually-impaired individual. The individual may create a profile within which the individual may have indicated the means to use for conveying the information. It is envisioned that the individual will carry a battery-operated RFID reader for reading information from the RFID tags and for conveying the information in accordance with the conveying means indicated in the profile.

1 Claim, 7 Drawing Sheets

METHOD OF USING RFID SYSTEMS TO HELP BLIND AND VISUALLY-IMPAIRED INDIVIDUALS

BACKGROUND OF THE INVENTION

1. Technical Field

The present invention is directed generally to Radio Frequency IDentification (RFID) systems. More specifically, the present invention is directed to an apparatus, system and method of using RFID systems to help blind and/or visually-impaired-individuals function in a modern society without the help of canes and seeing-eye dogs.

2. Description of Related Art

RFID is a technology that places identification data on small tags to be read by computers attached to antennas. An RFID system typically consists of a radio-enabled device that communicates with (i.e., interrogates) a tag or label, which contains a chip attached to an antenna. The chip and the antenna together are called a transponder. The chip contains the RF circuitry and information to be transmitted. The antenna enables the chip to transmit the information to the device.

In operation, the radio-enabled device, which is also known as a reader, sends out electromagnetic waves to the tag. The tag antenna is tuned to receive these waves. The tag, which is usually passive (i.e., un-powered), draws power from the electromagnetic waves and uses it to power the chip's circuit. Upon receiving the electromagnetic waves, the chip retrieves the stored information and passes it to the reader in the form of modulated radio waves. The reader converts the modulated radio waves into digital data.

Recently, RFID systems have been used to help the blind and the visually-impaired. For example, the Department of Veterans Affairs has now started to place RFID tags on prescriptions. The tags contain sufficient information to be able to convey the drug name, instructions, warnings, etc. to a reader. A talking RFID reader is used to supply the information to a blind or visually-impaired person.

Further, in METHOD AND SYSTEM FOR IDENTIFYING AN OBJECT AND ANNOUNCING A VOICE MESSAGE, by Krukowski et al. US Patent Application No. 20020121986 A1 (application Ser. No. 10/067,504) filed on Feb. 7, 2002 and published on Sep. 5, 2002, a method by which objects are identified and the identification of which is supplied in audible voice to the blind and the visually-impaired is disclosed. The method includes the steps of attaching an RFID tag that contains a code to an object and correlating a voice message to the code. The voice message is then stored in memory. When the code is read from the RFID tag, the voice message is obtained from memory and provided to a blind or visually-impaired person.

In the disclosure of the patent application mentioned above, which is incorporated herein by reference, as well as in the case of the Department of Veterans Affairs, a rather limited aspect of RFID systems is used to help the blind and the visually-impaired.

What is needed, therefore, is a system, apparatus and method of making broader uses of RFID systems to help the blind and the visually-impaired.

SUMMARY OF THE INVENTION

The present invention provides an apparatus, system and method of using RFID systems to help blind and visually-impaired individuals function efficiently in society without the use of canes and/or seeing-eye dogs. Generally, each object may contain an RFID tag affixed thereto. The tag will include information needed to help a blind or visually-impaired individual. The individual may create a profile within which the individual may have indicated the means to use for conveying the information. It is envisioned that the individual will carry an RFID reader for reading information from the RFID tags and for conveying the information in accordance with the conveying means indicated in the profile.

In a particular embodiment, the conveying means may be both aural and tactile while in another embodiment it may either be aural or tactile. The profile may contain a command that certain information be not conveyed. However, information stored in tags affixed to objects that are of a life-threatening or safety-related nature will always be conveyed. Further, the objects may be classified by genus having species such that tag information of a genus may be requested not to be conveyed while tag information of a species of the genus may be requested to be conveyed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
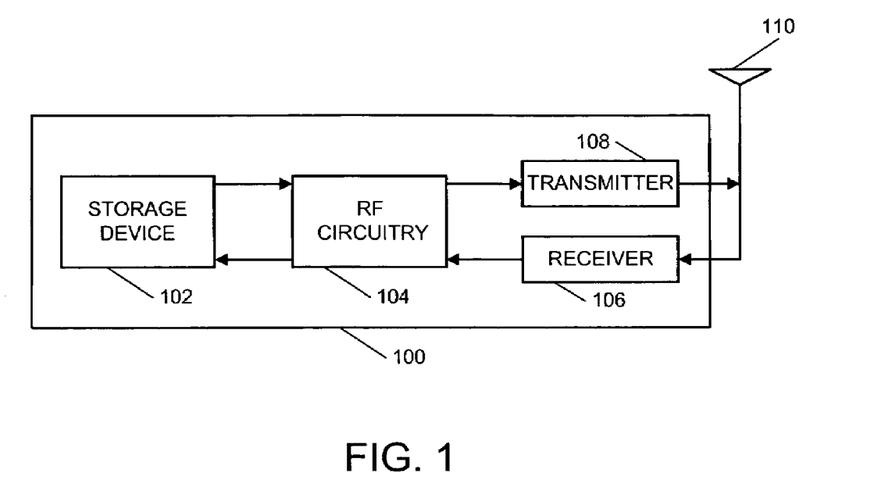
FIG. 1 illustrates an exemplary RFID tag in accordance with the present invention.

Turning to the figures, FIG. 1 illustrates an exemplary RFID tag in accordance with the present invention. As mentioned before, the RFID tag includes a chip 100 and an antenna 110. The chip contains a storage device 102 for storing identification information in a two-way communication with an RF circuitry 104. The RF circuitry 104 is in a one-way communication with transmitter 108 and receiver 106. Both transmitter 108 and receiver 106 are in a one-way communication with the antenna 110.

The RF circuitry 104, which may include a controller or processor (not shown) receives requests for its identification information from receiver 106. In response to the request, the RF circuitry retrieves the identification information from storage device 102 and transmits the identification information through transmitter 108. Storage device 102 may be, for example, a static memory, such as a read-only memory (ROM). The method of receiving requests, retrieving information from storage and transmitting the requested information is well known in the field and thus will not be herein explained.

Figure 2:
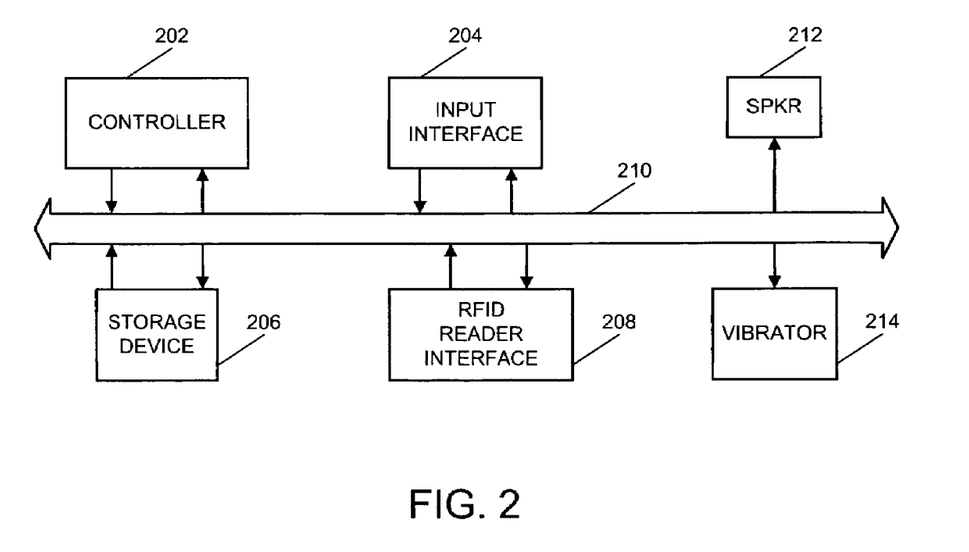
FIG. 2 depicts an exemplary functional block diagram of an RFID reader in accordance with a preferred embodiment of the present invention.

FIG. 2 depicts an exemplary functional block diagram of an RFID reader in accordance with a preferred embodiment of the present invention. The elements of the exemplary functional block diagram of FIG. 2 may be implemented as hardware or a combination of hardware and software components. The RFID reader includes a controller 202 (e.g. a processor), an input interface 204, a storage device 206 and an RFID reader interface 208 in communication with each other through bus 210. Note that although a bus architecture is disclosed, the present invention is not thus limited. Any architecture that facilitates communication among the elements of the RFID reader is perfectly within the realm of the invention.

Figure 3:
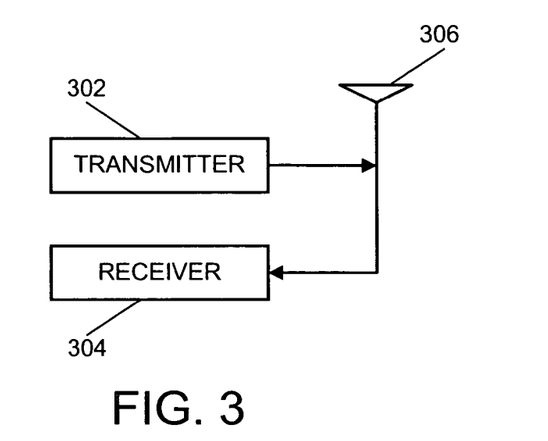
FIG. 3 depicts an exemplary RFID reader interface.

FIG. 3 depicts an exemplary RFID reader interface 208. The interface 208 includes a transmitter 302 and a receiver 304 in a one-way communication with antenna 306. The antenna 306 may be a directional antenna. A directional antenna is an antenna that transmits and/or receives at maximum power in a particular direction. In the case of the invention, the directional antenna receives and transmits at its maximum power in a direction of travel of a person carrying the invention.

In any event, the RFID reader is used to read identification information from tags. Again the method of reading information from tags is well known in the field and will not be explained.

The present invention provides a system and method of enabling blind and visually-impaired individuals to efficiently function in a modern society without the use of canes and seeing-eye dogs. The invention may rely on standardizing RFID tags for the blinds and the visually-impaired. For example, each object on which a tag is placed may have a safety level where the highest level may be reserved for objects that are of a life-threatening nature. The next level may be reserved for objects that are of a safety-related nature and the last level for objects that are of an informational-related nature. This allows an RFDI reader to prioritize the conveyance of information read from two or more RFID tags within a short span of time (i.e., a time that is less than the time needed for the controller to process and convey the first information).

To illustrate, an electrical fence and a telephone post which may be located in proximate distance to each other may each have a tag. A blind person walking by these two objects should be made aware of the electrical fence before being made aware of the telephone post since the electrical fence is of a life-threatening nature whereas the telephone post is of a safety-related nature. Likewise, if a telephone post is placed near the entrance to a store and both the telephone post and the entrance to the store have a tag attached thereto, then an individual should be made aware of the telephone post before being made aware of the entrance to the store since the entrance to the store is of an informational-related nature whereas the telephone post is of a safety-related nature.

Figure 4:
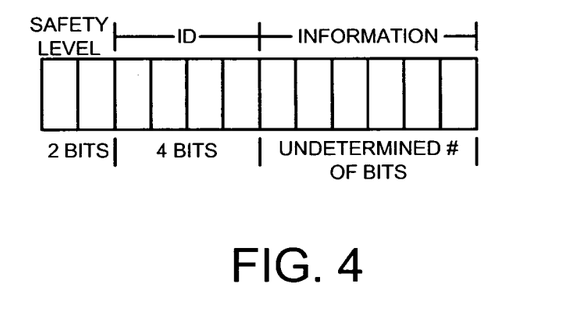
FIG. 4 depicts an exemplary protocol that tag identification information may use.

FIG. 4 depicts an exemplary protocol that tag identification information may use. The tag identification information may be of any length. However, the first two bits may be used to express the safety level of the object to which the tag is affixed falls under (i.e., whether it is of a life-threatening, safety-related or informational-related nature). The next set of bits (shown here as four but may be much greater) may be the identification of the object and the rest of the bits, the actual information that is to be relayed to a person.

For example, if all objects of a life-threatening nature is depicted by "1" and if 16 is the ID of an electrical fence, then the identification information on a tag affixed to an electrical fence should be 011000 - - - . The first two bits "01" represents safety level 1 and the next four bits "1000" represents the ID of the object and "- - -" indicates any information (i.e., voltage, location of the fence from the sidewalk etc.) that may be added to the tag. A synthesized voice may be used to relay the information via audio means to the individual (e.g., electrical fence of X amount of voltage is located 10 yards left of sidewalk).

Note that although only three safety levels are herein disclosed, there may be an unlimited number of different levels. In fact, it is envisioned that every object that may be encountered by a blind or visually-impaired individual should have a tag. These objects include prescription drugs, signs, store displays, store names, store business hours, path hazards (e.g., telephone posts, electrical fences, holes in the ground, low-hanging objects in paths etc.), food prices, food expiration dates etc. Therefore, there may be different gradations of levels. In addition, there may be genus IDs and species IDs (i.e., there may be objects that fall within subsets of other objects).

Further, due to the number of objects that may have a tag, there may be a huge amount of information that may be filtering in to an individual at every instant. Accordingly, it is advocated that each person have a profile. The profile will determine which information (especially those of an informational-related nature) to filter in and which to filter out.

Returning to FIG. 2, a blind or visually-impaired individual may carry a battery-powered RFID reader. The RFID reader may be incorporated in a hat, pair of glasses or any device (hand-held or otherwise) carried by the individual. The profile of the individual may be stored in storage device 206. The profile of the individual may be modified by connecting (wirelessly or otherwise) the RFID reader to a computer system through input interface 204. Likewise, any software, file etc. that is needed by the RFID reader may be downloaded to the reader via the input interface 204 and stored in storage device 206.

Figure 5:
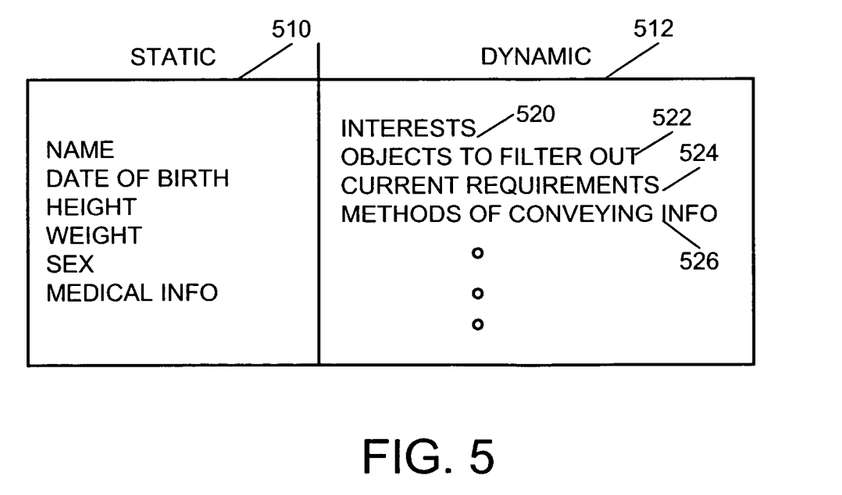
FIG. 5 displays an exemplary profile of an individual.

FIG. 5 displays an exemplary profile of an individual. The profile includes a static part 510 and a dynamic part 512. The static part 510 may include information that should not be easily modifiable (e.g., special passwords and confirmation algorithms may be used). Such information may include personal information such as name, date of birth, height, sex, whether or not the person knows how to swim, medical information of the individual etc. As an example of medical information that may include in the static part 510 is diabetes, allergies, asthma etc. This information should be retrievable in case of an emergency. For example, if the individual loses consciousness, an emergency medical technician (EMT) should be able to read the personal information from the profile to garner the medical history of the person.

The dynamic part 512 may include the interests of the individual 520, objects to filter out 522, current requirements 524, methods of conveying the information 526 and other information that an individual may want to store therein. The dynamic part 512 should be easily modifiable.

The interests of the individual 520 may include hobbies, whether the individual likes to read, travel, dine out etc.

The objects to filter out 522 may include tagged object the identification information of which the individual does not care to receive. For example, if an individual goes by a great number of stores on a particular route that are of no interest to the individual, the individual may decide that store identification information should be filtered out. In this case, the individual may enter the 4-bit ID (see FIG. 4) that identifies this type of information in the profile. All objects that have this 4-bit ID will be filtered out of the information that gets conveyed to the individual.

Thus, filtering information in or out may be carried out on route-related bases and further on time-related bases. For example, if an individual has a regularly scheduled meeting, the individual may decide to have objects whose tag information are read at the time of the meeting to be filtered out.

The method used to provide the appropriate configuration programming to the device so it knows to filter an individual item may also be achieved by a number of means to provide real time programming to the device. As an example a simple pressing of a button may be used to ignore the last item read or ignore the entire category the item belongs to. The method to invoke real time item or level filtering could be transmitted via various methods including a locally attached interface such as a keyboard or even the utterance of a voice command using speech recognition technology.

The current requirements 524 may include particular information that the individual wants to be filtered in. For example, although the individual may want to filter out stores in general, a particular store may be filtered in. This is where subclasses of classes are important in the tag identification information. Another example is if the individual wants to be notified of a certain object such as an ATM, the individual may want to include the 4-bit ID of ATMs therein.

The methods of conveying information 526 may be aural, tactile, or any other method that may be used to convey information to a blind or visually-impaired person. The different methods may be used in any combination. For example, a person may want to be notified of the presence of a life-threatening object both tactilely (e.g., by vibration through vibrator 214) and aurally (e.g., by synthesized voice through speaker 212). Note again that the information in the profile in FIG. 5 is not all inclusive. Any information that may deem important or necessary for an individual may be entered therein.

Figures 6A, 6B:
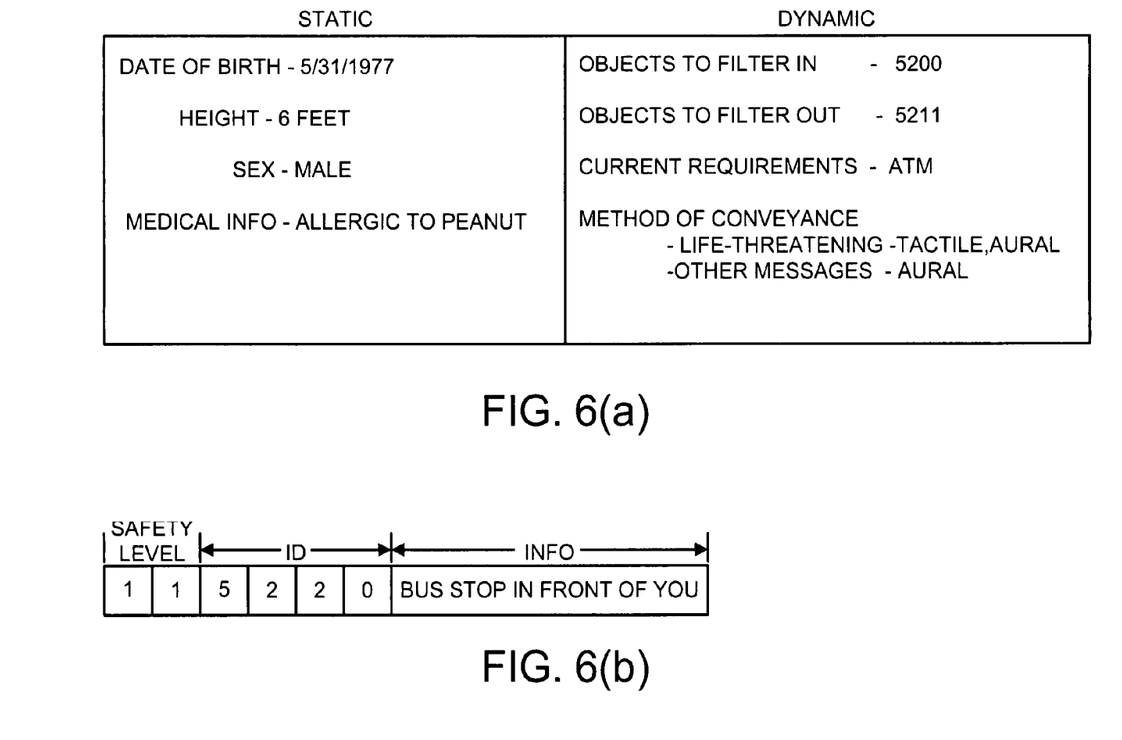
FIG. 6a displays a profile of a particular individual.
FIG. 6b depicts a first RFID tag identification information read by a reader worn by the individual.

As a practical example, consider a blind person having a profile as shown in FIG. 6a. Consider further that the person is out on a stroll and wearing an RFID reader of the present invention. As the person approaches a bus stop to which a tag is affixed, the bus stop RFID information will be transmitted to the RFID reader. Suppose that FIG. 6b is the RFID information of the bus stop that is sent to the RFID reader.

In FIG. 6b, the safety level of the bus stop is 3 (i.e., informational-related nature). The ID of the bus stop is "5220". (Note that here decimal numbers are used rather than binary numbers for simplicity reasons.) The info that is to be conveyed is "bus stop in front of you". The controller in the reader will check the profile to determine whether the information should be conveyed to the person and when it is to be conveyed. In this case, this is a moot point since only one RFID information is read by the RFID reader.

In the profile, all objects that fall within ID classification "5200" are to be filtered in and objects having ID "5211" are to be filtered out. In this case, let us suppose that ID "5200" is a genus ID of objects that are of an informational-related nature. Let us further suppose that ID "5211" is a species ID of objects that are of an informational-related nature but specifically directed toward advertisements. Upon checking the profile, the controller will determine that the information is to be conveyed to the person since it is of an informational-related nature that is not directed to advertisements.

The next step is to determine how the information is to be conveyed to the person. Again, in the profile it is stated that all objects of a life-threatening nature is to be conveyed both tactilely and aurally and all other information is to be conveyed only aurally. Since the bus stop information is safety level "3", the information will be delivered via audio. Hence, the controller will forward the information "bus stop in front of you" via speaker 212 (see FIG. 2) to the person.

Figure 6C:
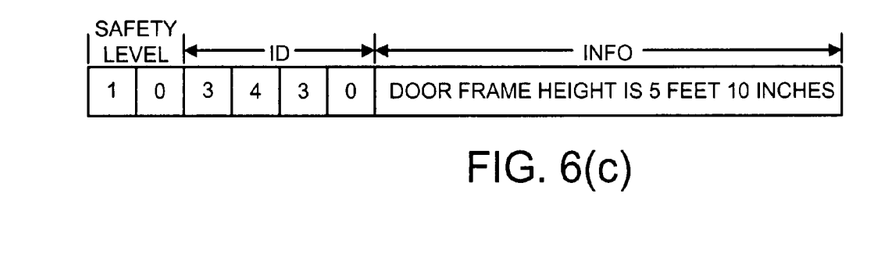
FIG. 6c depicts a second RFID tag identification information read by a reader worn by the individual.

Suppose later on the person is to enter a building through a front door to which is affixed a tag. As the person approaches the front door, the front door tag RFID information will be transmitted to the RFID reader that the person is wearing. Suppose further FIG. 6c is the RFID information that is transmitted to the reader. In this information, the object has a safety level of "2" (i.e., a safety-related object), the ID of the object is "3430", a door frame which is a species of genus "3400" OVERHEAD OBJECTS. The information that is to be conveyed to the person is "door frame height is 5 feet 10 inches".

Upon receiving the tag RFID information, the controller 202 will scrutinize the information for the safety-level and the ID. As before, since only one RFID information is read, the controller need not determine which information is to be provided first to the person. However, the ID of the object (i.e., door frame height) may prompt the controller to compare the height of the person in the profile with the height provided in the information. In this case, the comparison will reveal that the person will not clear the door frame without bending over. In such a case, even if the profile of the person indicated that the information was to be filtered out, the information would nonetheless be conveyed to the person since it is of a safety-related nature. Note that in the case where a person's height is shorter than a door frame height and the profile of the person states that the person is not to be bothered with overhead objects' heights, the information may not be provided. It is only when an imminent danger exists that the wish of the person, as indicated in the profile, is to be overridden.

In any event, the "door frame height is 5 feet 10 inches" information will be provided to the person via speaker 212. Note also that if along the way to the building the person passes an automatic teller machine (ATM) and if the ATM has a tag affixed thereto, the ATM's tag information will be conveyed to the person regardless to what information is to be filtered out since the profile of the person indicates that the person is in need of an ATM.

Figure 7:
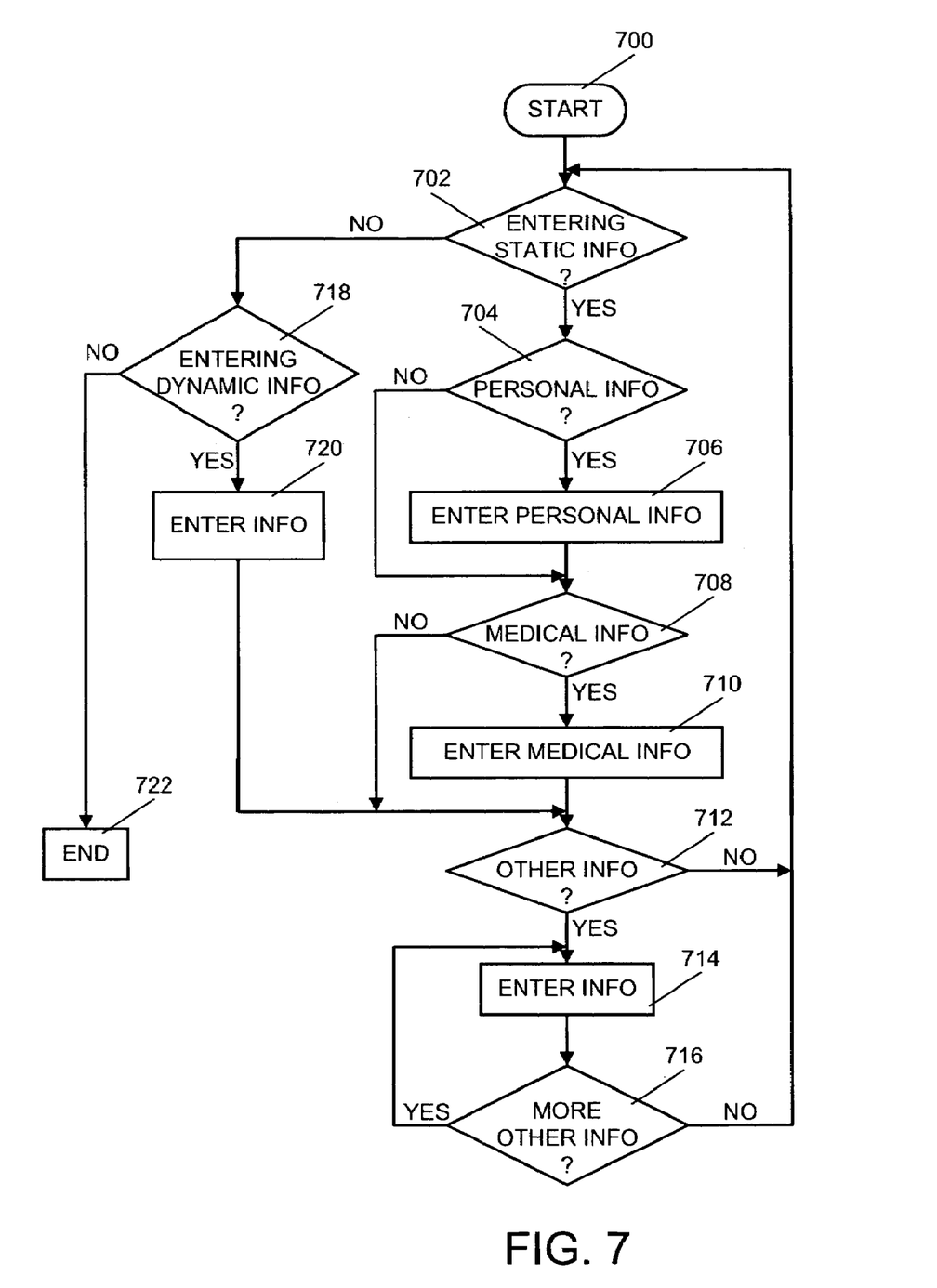
FIG. 7 is a flowchart of a process that may be used to create or to modify a person's profile.

FIG. 7 is a flowchart of a process that may be used to create or to modify a person's profile. The process may be stored on a computer system that is used to download files to an RFID tag reader. The process starts when a person accesses it for execution (step 700). At that point, the person may be prompted to indicate whether static information is to be entered (step 702). If so, the person may further be prompted to indicate whether personal information (i.e., name, date of birth, height, sex, etc.) is to be entered (step 704). If the person indicates that personal information is to be entered, the person will be allowed to enter the personal information (step 706). After entering the personal information or if the person indicates that personal information is not to be entered, the person may be asked to indicate whether medical information is to be entered (step 708). If medical information is to be entered, the person will be allowed to enter the information (step 710). After entering the medical information or if the person indicates that medical information is not to be entered, the person may be asked to indicate whether other information is to be entered (step 712). If other information is to be entered, the person will be allowed to enter as much other information as needed by going repeatedly through steps 714 and 716. After entering the information or if no other information is to be entered, the process will jump back to step 702.

After entering the static information or if no static information is to be entered, the person may be prompted to indicate whether dynamic information is to be entered (step 718). If the person indicates that dynamic information is to be entered, the person will be allowed to enter as much dynamic information as needed by going through step 720, step 712 and repeatedly through steps 714 and 716. After entering the information or if no dynamic information is to be entered, the process ends (722). The person may then download the profile to an RFID tag reader.

Figure 8:
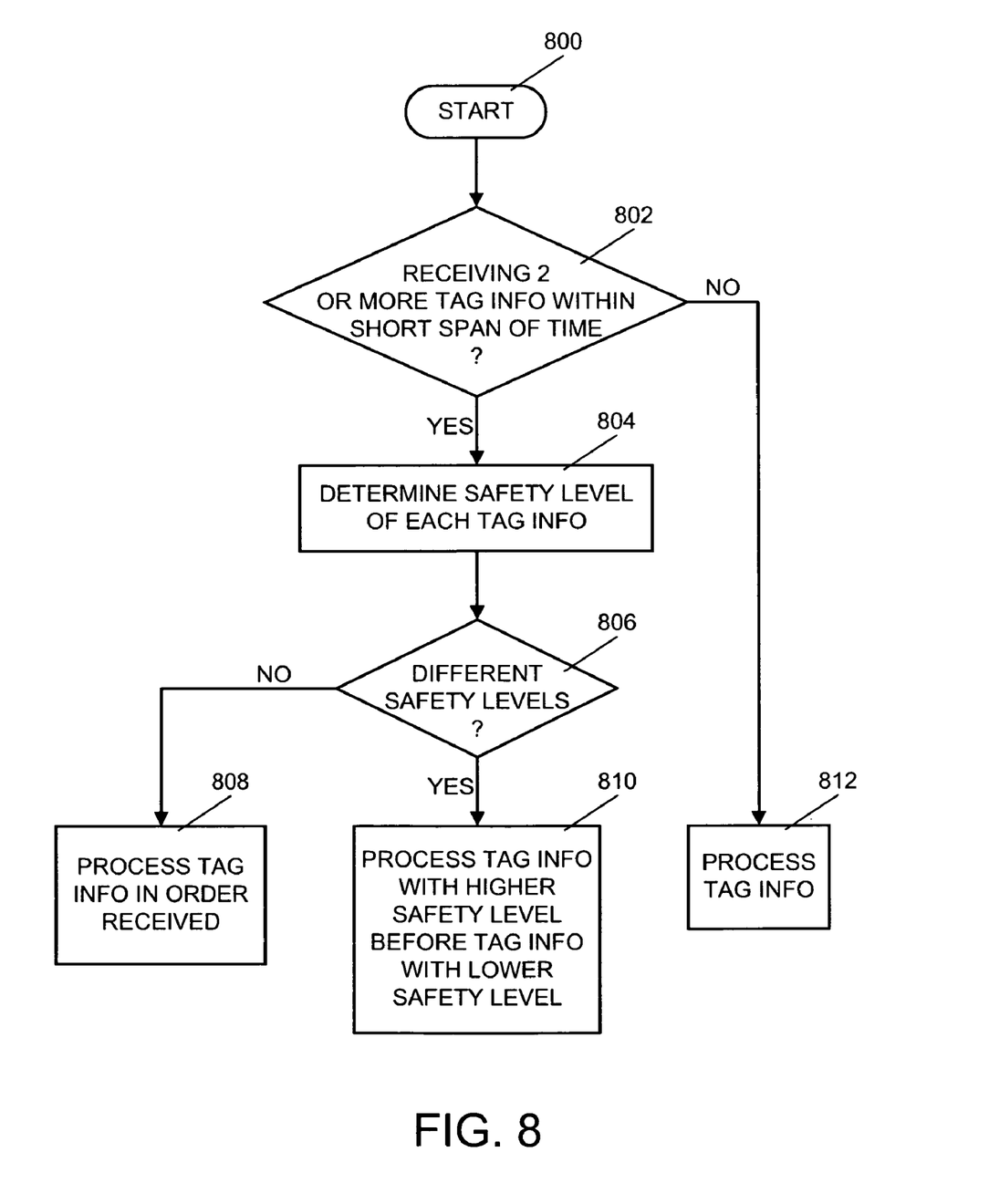
FIG. 8 is a flowchart of a process that may be used by an RFID tag reader.

FIG. 8 is a flowchart of a process that may be used by an RFID tag reader. The process starts when an RFID tag information is being read (step 800). So long as the tag reader has not conveyed the information to the person wearing the reader, it will be determined whether another tag information is being read (step 802). If there is only one tag information read, it will be processed (step 812). If more than one tag information is read, the safety level attached to each tag information read will be obtained to determine which tag information is to first be conveyed to the person. If they are of different safety levels, the tag information with the highest safety level will be processed first, then the next highest and so on until the tag information with the lowest safety level is processed. Tag information having the same safety level will be processed on a first come first processed basis (steps 806, 808 and 810).

Figure 9:
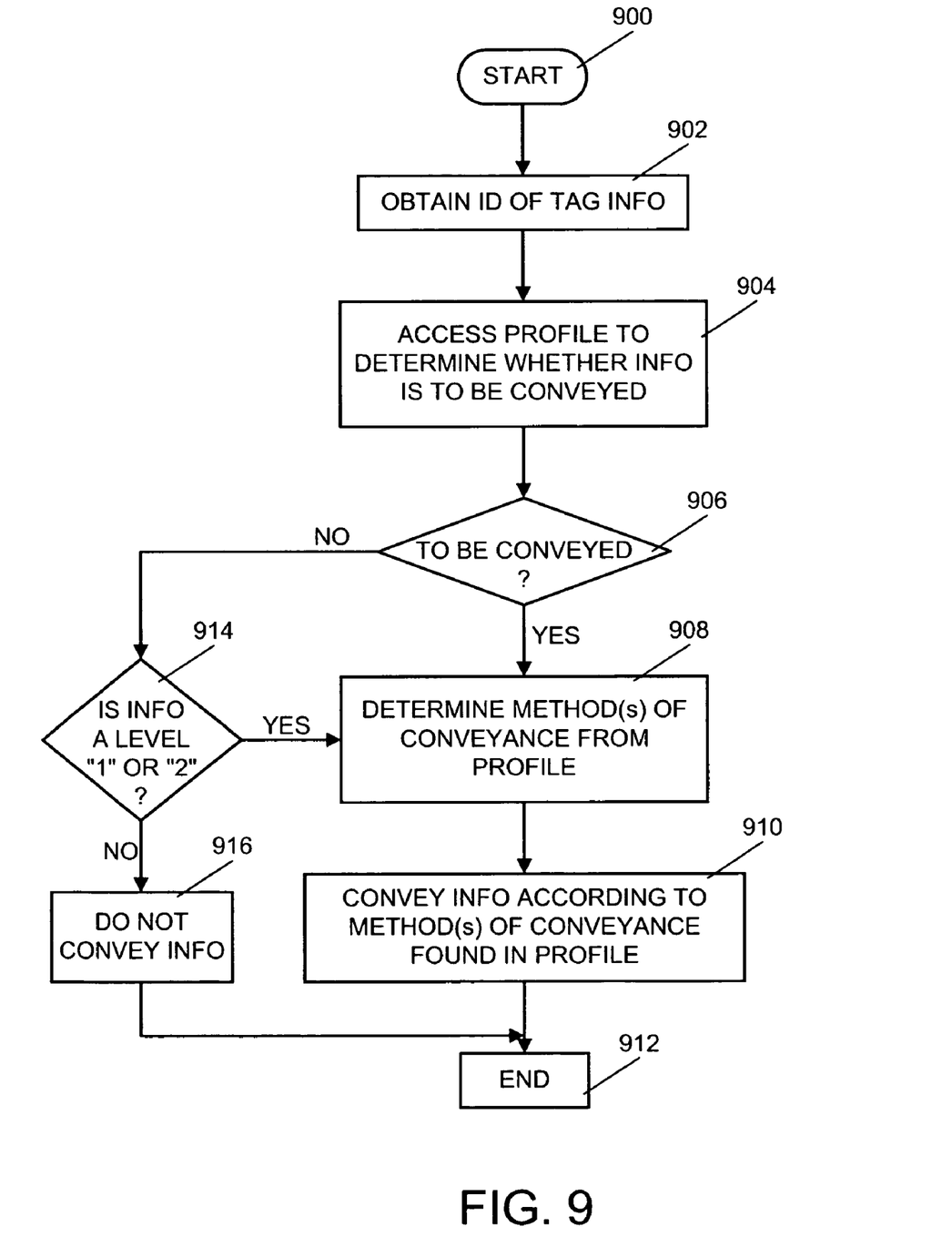
FIG. 9 is a flowchart of a process that may be used by an RFID tag reader to process a tag information.

FIG. 9 is a flowchart of a process that may be used by an RFID tag reader to process a tag information. This process will be repeated for each tag information read. The process starts when a tag information is read (step 900). Then the ID of the tag information is obtained and the profile stored in the storage device 206 (see FIG. 2) of the reader will be consulted to determine whether the info is to be conveyed to the person (steps 902, 904 and 906). If the information is to be conveyed, the method or methods of conveyance (if any) will be determined from the profile and the information will be conveyed in accordance with such method or methods (steps 908 and 910). Note that the default method of conveyance is audio. If the information is not to be conveyed, the information may nevertheless be provided if it has a safety level of "1", life-threatening nature, or "2", safety-related nature (steps 914, 908 and 910). Otherwise, the information will not be provided to the person (steps 914 and 916). After conveying the information or after determining that the information is not to be conveyed, the process may end (step 912).

Figure 10:
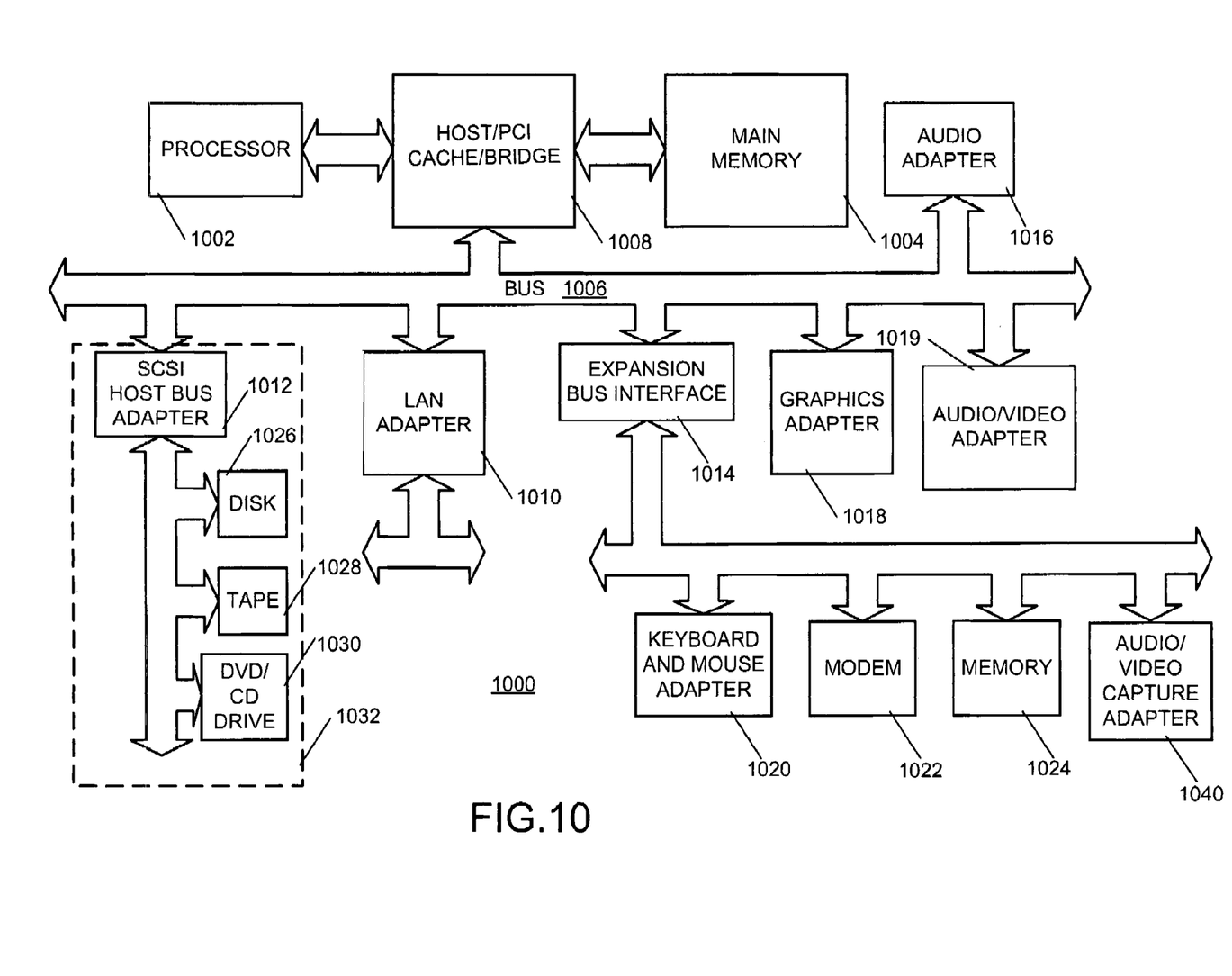
FIG. 10 is a detailed block diagram 1000 of a computer system that may be used to enter information into an RFID reader.

FIG. 10 is a detailed block diagram 1000 of a computer system that may be used to enter the information into an RFID reader. The block diagram 1000 includes a peripheral component interconnect (PCI) local bus architecture. Although the depicted example employs a PCI bus, any bus architectures including but not limited to Accelerated Graphics Port (AGP) and Industry Standard Architecture (ISA) may be used. Processor 1002 and main memory 1004 are connected to PCI local bus 1006 through PCI bridge 1008. PCI bridge 1008 also may include an integrated memory controller and cache memory for processor 1002. Additional connections to PCI local bus 1006 may be made through direct component interconnection or through add-in boards. In the depicted example, local area network (LAN) adapter 1010, SCSI host bus adapter 1012, and expansion bus interface 1014 are connected to PCI local bus 1006 by direct component connection. In contrast, audio adapter 1016, graphics adapter 1018, and audio/video adapter 1019 are connected to PCI local bus 1006 by add-in boards inserted into expansion slots. Expansion bus interface 1014 provides a connection for a keyboard and mouse adapter 1020, modem 1022, additional memory 1024 and an audio/video capture adapter 1040. Small computer system interface (SCSI) host bus adapter 1012 provides a connection for hard disk drive 1026, tape drive 1028, and CD/DVD-Drive 1030. Typical PCI local bus implementations will support three or four PCI expansion slots or add-in connectors.

An operating system runs on processor 1002 and is used to coordinate and provide control of various components within the block diagram 1000 in FIG. 10. The operating system may be a commercially available operating system, such as Windows XP, which is available from Microsoft Corporation or AIX, which available from Internal Business Machines Corp.

An object oriented programming system such as Java may run in conjunction with the operating system and provide calls to the operating system from Java programs or applications executing on the computer system. "Java" is a trademark of Sun Microsystems, Inc. Instructions for the operating system, the object-oriented operating system, and applications or programs are located on storage devices, such as hard disk drive 1026, and may be loaded into main memory 1004 for execution by processor 1002.

Those of ordinary skill in the art will appreciate that the hardware in FIG. 10 may vary depending on the implementation. Other internal hardware or peripheral devices, such as flash ROM (or equivalent nonvolatile memory) or optical disk drives and the like, may be used in addition to or in place of the hardware depicted in FIG. 10. Also, the processes of the present invention may be applied to a multiprocessor data processing system.

The depicted example in FIG. 10 and above-described examples are not meant to imply architectural limitations. For example, the block diagram 1000 may also be a notebook computer or hand held computer as well as a kiosk or a Web appliance.

The description of the present invention has been presented for purposes of illustration and description, and is not intended to be exhaustive or limited to the invention in the form disclosed. Many modifications and variations will be apparent to those of ordinary skill in the art. For example, other user interfaces may be employed to carry out the invention. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of using RFID systems to help blind and visually-impaired individuals function in society without canes and seeing-eye dogs comprising the steps of:

affixing onto objects RFID tags, each RFID tag having tag information stored therein to help a blind or visually-impaired individual, the tag information including data for determining whether an object to which an RFID tag is affixed is of a life-threatening, safety-related or informational-related nature;

enabling the blind or visually-impaired individual to create a profile, the profile for indicating a means of conveying the tag information to the blind or visually-impaired individual and containing instructions that certain tag information be not conveyed; and enabling the blind or visually-impaired individual to carry an RFID reader, the RFID reader for reading tag information from the RFID tags and for conveying the tag information to the individual in accordance with the indicated conveying means, wherein tag information of objects that are of a life-threatening or safety-related nature are conveyed in spite of not to convey instructions and wherein objects are classified by genus having at least two species such that tag information of a genus may be requested not to be conveyed except for a particular one of the two species of the genus.

* * * * *